(12) United States Patent
Thiriet et al.

(10) Patent No.: US 10,435,167 B2
(45) Date of Patent: Oct. 8, 2019

(54) METHOD FOR AUTOMATICALLY CONTROLLING THE OPERATING SPEED OF A HELICOPTER TURBOSHAFT ENGINE, CORRESPONDING CONTROL DEVICE AND HELICOPTER PROVIDED WITH SUCH A DEVICE

(71) Applicant: TURBOMECA, Bordes (FR)

(72) Inventors: Romain Thiriet, Jurancon (FR); Caroline Seve, Pau (FR); Vincent Poumarede, Tarbes (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 250 days.

(21) Appl. No.: 15/104,470

(22) PCT Filed: Dec. 15, 2014

(86) PCT No.: PCT/FR2014/053351
§ 371 (c)(1),
(2) Date: Jun. 14, 2016

(87) PCT Pub. No.: WO2015/092252
PCT Pub. Date: Jun. 25, 2015

(65) Prior Publication Data
US 2016/0311548 A1    Oct. 27, 2016

(30) Foreign Application Priority Data
Dec. 20, 2013   (FR) ...................................... 13 63316

(51) Int. Cl.
*B64D 31/06*    (2006.01)
*F02C 6/02*    (2006.01)
(Continued)

(52) U.S. Cl.
CPC ............. *B64D 31/06* (2013.01); *F01D 21/02* (2013.01); *F02C 6/02* (2013.01); *F02C 6/206* (2013.01);
(Continued)

(58) Field of Classification Search
None
See application file for complete search history.

(56) References Cited

U.S. PATENT DOCUMENTS 8,768,598 B2 * 7/2014 McCollough ............. F02C 9/28
244/195
9,476,360 B2 * 10/2016 Corpron ................. B64D 31/00
(Continued)

FOREIGN PATENT DOCUMENTS

EP    2301844    3/2011
EP    2626537    8/2013
(Continued)

OTHER PUBLICATIONS

International Search Report, with English Language Translation, dated Mar. 23, 2015, Application No. PCT/FR2014/053351.
(Continued)

*Primary Examiner* — Thomas G Black
*Assistant Examiner* — Demetra R Smith-Stewart
(74) *Attorney, Agent, or Firm* — Womble Bond Dickinson (US) LLP

(57) ABSTRACT

The invention relates to a method for automatically controlling an operating mode of a turboshaft engine of a helicopter, comprising a step (10) of receiving data (27, 28, 29) that are representative of the flight of the helicopter; a step (11) of selecting the turboshaft engine for which a change of mode would be most relevant; a step (12) of determining an operating mode of said turboshaft engine, known as the selected mode, selected from a plurality of predetermined
(Continued)

Figures 1, 2:
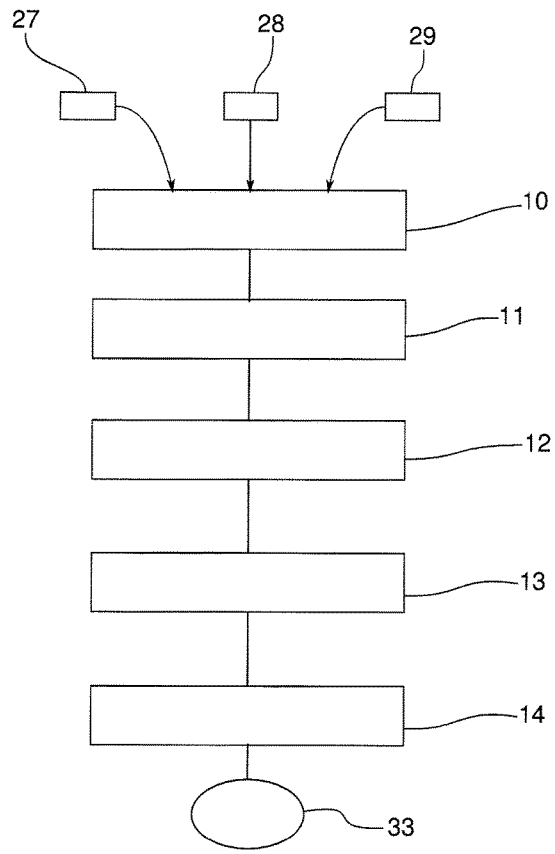

operating modes; and a step (14) of ordering the operating mode of said turboshaft engine into said selected mode. The invention also relates to a corresponding control device.

14 Claims, 2 Drawing Sheets

(51) Int. Cl.
    *F02C 6/20*        (2006.01)
    *F02C 9/28*        (2006.01)
    *F01D 21/02*      (2006.01)

(52) U.S. Cl.
    CPC .......... *F02C 9/28* (2013.01); *F05D 2220/329* (2013.01); *F05D 2270/02* (2013.01); *F05D 2270/07* (2013.01); *F05D 2270/09* (2013.01); *F05D 2270/093* (2013.01); *F05D 2270/13* (2013.01); *Y02T 50/671* (2013.01)

(56) References Cited

U.S. PATENT DOCUMENTS

| | | | | |
|---|---|---|---|---|
| 2011/0154805 | A1* | 6/2011 | Heathco | F01D 15/10 60/226.1 |
| 2012/0153074 | A1 | 6/2012 | Nannoni et al. | |
| 2013/0166169 | A1* | 6/2013 | McCollough | F02C 9/28 701/99 |
| 2013/0199198 | A1* | 8/2013 | Corpron | F01D 5/12 60/773 |
| 2014/0020396 | A1* | 1/2014 | Corpron | B64D 31/00 60/772 |
| 2014/0303871 | A1* | 10/2014 | Presse | B64D 41/00 701/100 |
| 2014/0365036 | A1* | 12/2014 | Moeckly | F02C 9/00 701/3 |
| 2015/0251770 | A1* | 9/2015 | Bisson | B64D 31/06 244/58 |
| 2015/0266589 | A1* | 9/2015 | Blumer | B64D 37/00 244/135 R |
| 2016/0055754 | A1* | 2/2016 | Ling | G08G 5/0056 701/14 |

FOREIGN PATENT DOCUMENTS

| | | |
|---|---|---|
| JP | 2005-247008 A | 9/2005 |
| JP | 2012-529401 A | 11/2012 |
| WO | 2010/143051 A2 | 12/2010 |
| WO | WO-2012059671 | 5/2012 |
| WO | WO-2013076434 | 5/2013 |

OTHER PUBLICATIONS

Office Action received for European Patent Application No. 14827845.0, dated Nov. 5, 2018, 4 pages of Office Action Only.

\* cited by examiner

| Régime | 1 | 2 | 3 | 4 | 5 | 6 | 7 | 8 |
|---|---|---|---|---|---|---|---|---|
| A | [<A2] | [A2; A3] | [A3; A4] | [A4; A5] | [A5; A6] | [A6; A7] | [A7; A8] | [>A8] |
| B | [<B2] | [B2; B3] | [B3; B4] | [B4; B5] | [B5; B6] | [B6; B7] | [B7; B8] | [>B8] |
| C | [<C2] | [C2; C3] | [C3; C4] | [C4; C5] | [C5; C6] | [C6; C7] | [C7; C8] | [>C8] |
| D | [<D2] | [D2; D3] | [D3; D4] | [D4; D5] | [D5; D6] | [D6; D7] | [D7; D8] | [>D8] |
| E | [<E2] | [E2; E3] | [E3; E4] | [E4; E5] | [E5; E6] | [E6; E7] | [E7; E8] | [>E8] |
| ... | ... | ... | ... | ... | ... | ... | ... | ... |

METHOD FOR AUTOMATICALLY CONTROLLING THE OPERATING SPEED OF A HELICOPTER TURBOSHAFT ENGINE, CORRESPONDING CONTROL DEVICE AND HELICOPTER PROVIDED WITH SUCH A DEVICE

1. TECHNICAL FIELD

The invention relates to a method for automatically controlling the operating mode of at least one turboshaft engine of a helicopter. The invention also relates to a corresponding control device and to a helicopter provided with a control device of this kind. The invention relates in particular to a method for controlling a turboshaft engine of a helicopter during all the mission phases it carries out, outside of critical flight situations.

2. TECHNICAL BACKGROUND

A helicopter is generally provided with at least two turboshaft engines which operate at modes that depend on the flight conditions of the helicopter. Throughout the following text, a helicopter is said to be in a cruise flight situation when it is progressing in normal conditions, in a mode known by the abbreviation AEO (All Engines Operative), during all the flight phases apart from transitional phases of take-off, ascent, landing or hovering flight. Throughout the following text, a helicopter is said to be in a critical flight situation when it is necessary for it to have available the total installed capacity, i.e. during the transitional phases of take-off, ascent, landing and the mode in which one of the turboshaft engines malfunctions, referred to by the abbreviation OEI (One Engine Inoperative).

It is known that, when the helicopter is in a cruise flight situation, the turboshaft engines operate at low power levels, below their maximum continuous thrust (hereinafter MCT). In some arrangements, the power provided by the turboshaft engines during a cruise flight can be less than 50% of the maximum take-off thrust (hereinafter MTO). These low power levels result in a specific consumption (hereinafter SC), which is defined as the relationship between the hourly fuel consumption by the combustion chamber of the turboshaft engine, and the thrust provided by said turboshaft engine, which is approximately 30% greater than the SC of the MTO, and thus an overconsumption of fuel during cruise flight.

Finally, during holding phases on the ground, the pilots generally prefer to put the various turboshaft engines into ground idling so as to be certain of being able to restart them. The turboshaft engines thus continue to consume fuel, despite not providing any power.

Moreover, the turboshaft engines of a helicopter are designed so as to be oversized in order to be able to keep the helicopter in flight in the event of failure of one of the engines. This flight situation corresponds to the OEI mode described above. This flight situation occurs following the loss of an engine, and results in the fact that each functioning motor provides a power that is significantly greater than its rated power in order to allow the helicopter to overcome a dangerous situation, and to then continue its flight. The fuel consumption of each functioning turboshaft engine is therefore significantly increased in the OEI situation in order to provide this power increase.

At the same time, the turboshaft engines are also oversized so as to be able to ensure flight in the entire flight range specified by the aircraft manufacturer, and in particular flight at high altitudes and during hot weather. These flight points, which are very restrictive, in particular when the helicopter has a mass that is close to its maximum take-off mass, are only encountered in specific use cases of specific helicopters. As a result, some turboshaft engines, although dimensioned so as to be able to provide such powers, will never fly in such conditions.

These oversized turboshaft engines have an adverse effect in terms of mass and in terms of fuel consumption. In order to reduce this consumption, in all the cases of flight described above (cruise flight, OEI mode, taxiing, hovering flight, or holding on the ground), it is possible to stop one of the turboshaft engines and to put it into what is known as standby mode. The active engine or engines then operate at higher power levels in order to provide all the necessary power, and therefore at more favourable SC levels. However, this practice is contrary to the current certification rules, and turboshaft engines are not designed to ensure a level of restart reliability that is compatible with safety standards. Likewise, the pilots are not currently aware of or familiar with the idea of putting a turboshaft engine into standby mode during flight.

Furthermore, the restart duration of the turboshaft engine in standby mode is typically approximately thirty seconds. This duration may prove to be too long for some flight conditions, for example at a low flight altitude with a partial or complete malfunction of the initially active engine. If the engine in standby mode does not restart in time, landing using the engine in difficulty may prove to be critical or may even result in a complete loss of power.

More generally, the immediate availability of the power of a single turboshaft engine entails risks in all the flight situations in which it is necessary to provide an increase in power that requires, in terms of safety, to be able to have available the total power of the turboshaft engines.

In FR1151717 and FR1359766, the applicants have proposed methods for optimising the specific consumption of the turboshaft engines of a helicopter by means of the possibility of putting at least one turboshaft engine into a stable flight mode, known as continuous, and at least one turboshaft engine into a particular standby mode that it can leave in an urgent or normal manner, according to need. Leaving the standby mode is said to have occurred normally when a change in the flight situation requires the turboshaft engine in standby to be activated, for example when the helicopter is going to transition from a cruise flight situation to a landing phase. Leaving standby mode normally in this manner occurs over a period of between 10 seconds and 1 minute. Leaving the standby mode is said to have occurred urgently when a failure of or a power deficit in the active engine occurs, or when the flight conditions suddenly become difficult. Leaving standby mode urgently in this manner occurs over a period of less than 10 seconds.

The applicants have thus proposed the following five standby modes:
  a standby mode known as normal idling, in which the combustion chamber is ignited and the shaft of the gas generator rotates at a speed of between 60 and 80% of the nominal speed,
  a standby mode known as normal super-idling, in which the combustion chamber is ignited and the shaft of the gas generator rotates at a speed of between 20 and 60% of the nominal speed,
  a standby mode known as assisted super-idling, in which the combustion chamber is ignited and the shaft of the gas generator rotates, in a mechanically assisted manner, at a speed of between 20 and 60% of the nominal speed, a standby mode known as banking, in which the combustion chamber is extinguished and the shaft of the gas generator rotates, in a mechanically assisted manner, at a speed of between 5 and 20% of the nominal speed;

a standby mode known as stopping, in which the combustion chamber is extinguished and the engine shaft is completely stopped.

The technical problem is now that of defining which turboshaft engine needs to be put into standby mode. Another technical problem is that of determining which standby mode should be selected from all of the available standby modes. Another technical problem is that of being able to transition from one standby mode to another, according to the flight conditions of the helicopter. Another technical problem is that of leaving the standby modes and returning to a nominal operating mode.

3. OBJECTS OF THE INVENTION

The invention aims to provide an effective and economical solution to this technical problem.

In particular, the invention aims to provide, in at least one embodiment of the invention, a method for controlling the operating mode of a turboshaft engine of a helicopter.

The invention also aims to provide a corresponding control device and a helicopter provided with a control device of this kind.

4. DESCRIPTION OF THE INVENTION

In order to achieve this, the invention relates to a method for automatically controlling the operating mode of a turboshaft engine of a helicopter that is not in a critical flight situation and comprises at least two turboshaft engines, said method comprising:

a step of receiving data that are representative of the flight of the helicopter, a step of determining an operating mode of said turboshaft engine, known as the selected mode, that is selected from a plurality of predetermined operating modes on the basis of said data that are representative of the flight of the helicopter, a step of ordering the operating mode of said turboshaft engine into said selected mode.

A method according to the invention therefore makes it possible to automatically select an operating mode of a turboshaft engine of a helicopter from a plurality of predetermined modes. The selection of the mode depends on the data that are representative of the flight of the helicopter. Thus, a control method according to the invention makes it possible to adapt the engine speed to the progression of the data that are representative of the flight of the helicopter. A method according to the invention thus makes it possible to transition from one operating mode to another more favourable (or less favourable) one if this is permitted or required by the data that are representative of the flight.

The invention is particularly suitable for selecting a standby mode for the turboshaft engine when the helicopter is in a cruise flight situation. Depending on the values of the data that are representative of the flight of the helicopter, the method can order that said turboshaft engine be put into standby mode and/or change from standby mode and/or leave standby mode if the conditions require this.

Advantageously, a method according to the invention comprises a step of allocating, to each item of data received, an operating mode, known as the designated mode, that is selected from the plurality of operating modes and depends on the value of said item of data.

Advantageously and according to this variant, each value that each item of data may assume has one single corresponding designated mode. In other words, a designated mode is associated with a single range of values of each item of data.

A method according to this variant thus makes it possible to allocate a designated operating mode to each item of data that has been received and analysed, which mode depends on the value of the item of data. In other words, the invention provides a predetermined chart that associates a predetermined mode with each possible value of this item of data. These associations are invariable and are made such that the designated mode is the most fuel-efficient operating mode that is permitted by the value of the item of data.

Advantageously and according to the invention, said step of determining said selected mode consists in selecting a mode from all of the designated modes provided by said allocation step, according to a predetermined order of priority.

Advantageously and according to the invention, the plurality of predetermined operating modes of a turboshaft engine comprising a combustion chamber and a gas generator shaft comprises at least the following modes:

a standby mode known as normal idling, in which said combustion chamber is ignited and said shaft of the gas generator rotates at a speed of between 60 and 80% of the nominal speed, a standby mode known as normal super-idling, in which said combustion chamber is ignited and said shaft of the gas generator rotates at a speed of between 20 and 60% of the nominal speed, a standby mode known as assisted super-idling, in which said combustion chamber is ignited and said shaft of the gas generator rotates, in a mechanically assisted manner, at a speed of between 20 and 60% of the nominal speed, a standby mode known as banking, in which said combustion chamber is extinguished and said shaft of the gas generator rotates, in a mechanically assisted manner, at a speed of between 5 and 20% of the nominal speed, a standby mode known as stopping, in which said combustion chamber is extinguished and said shaft of the gas generator is completely stopped, an urgent standby-leaving mode, in which the combustion chamber is ignited and the shaft of the gas generator is brought to a speed of between 80 and 105% within a period of less than 10 seconds following an order to leave standby mode, a normal standby-leaving mode, in which the combustion chamber is ignited and the shaft of the gas generator is brought to a speed of between 80 and 105% within a period of between 10 seconds and 1 minute following an order to leave standby mode, a nominal operating mode, in which the combustion chamber is ignited and the shaft of the gas generator is driven at a speed of between 80 and 105%.

A method according to the invention thus makes it possible to order the transition of the turboshaft engine into at least one operating mode selected from a plurality of standby modes, an urgent standby-leaving mode, a normal standby-leaving mode, and a nominal operating mode.

Advantageously and according to the invention, said predetermined order of priority is as follows:
nominal operating mode,
urgent standby-leaving mode,
normal standby-leaving mode,
normal idling mode,
normal super-idling mode,
assisted super-idling mode,
banking mode,
stopping mode.

In other words, the step of determining said selected mode consists in selecting the mode from all of said designated modes provided by said allocation step, according to the following order of priority: nominal operating mode, urgent standby-leaving mode, normal standby-leaving mode, normal idling mode, normal super-idling mode, assisted super-idling mode, banking mode, and stopping mode.

According to this variant, the determination step selects the mode having the highest priority from all of the designated modes that are associated with each of the items of data and are provided by the allocation step. The order of priority of the modes has been defined such that the safety of the flight is always ensured and is always at a maximum. This means that the mode having the highest priority is the nominal operating mode. This is the mode in which the turboshaft engine can operate at full speed, and therefore where the installed capacity is immediately available. The mode having the next highest priority is the urgent standby-leaving mode, which aims to switch rapidly to the nominal operating mode. The mode having the next highest priority is the normal standby-leaving mode, then the normal idling mode, then the normal super-idling mode, then the assisted super-idling mode, then the banking mode, and finally the stopping mode.

In other words, and by way of example, if the value of at least one of the analysed items of data is in the range of values associated with the nominal operating mode, the selected mode will necessarily be the nominal operating mode. In other words, in this example the control device does not permit the engine to go into standby mode since one of the conditions monitored indicates that the helicopter needs to be able to have available the total power of the turboshaft engine in order to ensure optimum safety conditions.

According to another example, if the value of at least one of the analysed items of data indicates the urgent standby-leaving mode and if the current operating mode is not the nominal operating mode, the selected mode will necessarily be the urgent standby-leaving mode. Indeed, this shows that the current operating mode of the turboshaft engine does not make it possible to ensure an adequate level of security on account of at least one of the conditions monitored. This therefore necessitates urgently leaving the current standby mode in order to switch to the nominal operating mode.

According to another example, if the value of one of the analysed items of data indicates the assisted super-idling mode and if no other value indicates an operating mode having a higher priority (i.e. if no value indicates the nominal mode, the urgent standby-leaving mode, the normal standby-leaving mode, the normal idling mode, or the normal super-idling mode), then the assisted super-idling mode is the selected mode and the turboshaft engine is put into assisted super-idling mode.

A method according to the invention continuously monitors all of the data that are representative of the flight of the helicopter, and automatically adapts the operating mode of the helicopter to the progression of the conditions.

A method according to the invention thus makes it possible to optimise the safety of the flight by continuously selecting the operating mode that is most suitable for the situation encountered.

Moreover, a method according to the invention contributes to optimising fuel consumption by continuously attempting to put the engines into the most favourable mode possible, while ensuring the safety of the flight. The order of the most favourable, and therefore the most fuel-efficient, modes is the reverse order of that of the prioritised modes: stopping mode, banking mode, assisted super-idling mode, normal super-idling mode, normal idling mode, normal standby-leaving mode, urgent standby-leaving mode, and nominal operating mode.

If the selected mode is different from the current mode, the method according to the invention automatically causes the turboshaft engine to switch to the selected mode. This also makes it possible to strive for the mode that is most favourable in terms of fuel consumption if the flight conditions permit, or to remain in optimum safety conditions.

Of course, if no standby mode is possible, the turboshaft engine remains in a nominal operating mode and no standby mode is possible if the data do not allow this.

Advantageously and according to the invention, the data that are representative of the flight of the helicopter comprise data about the flight conditions of the helicopter and/or data about the environmental conditions of the helicopter and/or data about the state of said turboshaft engine.

The data about the flight conditions of the helicopter are, for example, data that are representative of the forward speed of the helicopter, the fuel consumption, the level of constraints, the power margin available with respect to the operational limitations of the turboshaft engine, etc.

The data about the environmental conditions are, for example, data that are representative of the outside temperature, the outside pressure, the height above the ground, the humidity, the atmospheric conditions (rain, frost, wind, thunderstorm, etc.), the presence of nearby obstacles, etc.

The data about the state of the turboshaft engine are, for example, data that are representative of the amount of damage to the turboshaft engine, the state of the turbine, the state of the non-propulsive parts of the power pack (electrical machines, power electronics, hydraulic machines, tyres, pyrotechnics), the state of the energy storage means intended for urgent start-up, failure management, etc.

The data that are representative of the flight of the helicopter therefore cannot comprise all the above-mentioned data as well as the variation of these data, such as the variation of the altitude relative to the ground or the variation of the forward speed.

A method according to the invention thus makes it possible to take account of a plurality of different data and to derive therefrom an operating mode of the turboshaft engine that is suitable for the flight situation of the helicopter.

Advantageously, a method according to the invention further comprises a step of selecting one turboshaft engine from said turboshaft engines of said helicopter for which a change of mode would be most relevant.

According to this advantageous variant, the method determines, from all the turboshaft engines of the helicopter, that engine which could possibly be put into a more favourable mode, in particular standby mode. This selection can be determined, for example, on the basis of the wear of each turboshaft engine, the most worn turboshaft engine then being selected to be put into standby mode if the data that are representative of the flight of the helicopter permit this. This selection can also consist in selecting each turboshaft engine alternately, such that, during the first possible standby a first turboshaft engine is selected during the selection step, and during the second possible standby a second turboshaft engine is selected during the selection step, and so on.

The invention also relates to a device for automatically controlling an operating mode of a turboshaft engine of a helicopter, comprising:
- a module for receiving data that are representative of the flight of the helicopter,
- a module for determining an operating mode of said turboshaft engine, known as the selected mode, selected from a plurality of predetermined operating modes on the basis of said data that are representative of the flight of the helicopter,
- a module for ordering said operating mode of said turboshaft engine into said selected mode.

A control device according to the invention advantageously implements a method according to the invention, and a method according to the invention is advantageously implemented by a device according to the invention.

Throughout the text, a "module" denotes a software element, a sub-unit of a software program that can be compiled separately, either for independent use or to be assembled together with other modules of a program, or a hardware element, or a combination of a hardware element and a software subroutine. A hardware element of this kind can comprise an integrated circuit that is specific to an application (known by the abbreviation ASIC—Application-Specific Integrated Circuit), or a programmable logic device, or any equivalent hardware. In general terms, a module is thus an element (software and/or hardware) that makes it possible to ensure a function.

Advantageously, a device according to the invention comprises a module for allocating, to each item of data received by said reception module, an operating mode, known as the designated mode, that is selected from said plurality of operating modes and depends on the value of said item of data.

Advantageously and according to the invention, said module for determining a selected mode is designed to select the selected mode from all of said designated modes provided by said allocation module, according to a predetermined order of priority.

Advantageously, a control device according to the invention further comprises a module for selecting, from said turboshaft engines of said helicopter, the turboshaft engine for which a change of mode would be most relevant.

The invention also relates to a helicopter comprising at least two turboshaft engines, each turboshaft engine comprising a gas turbine that is controlled by a regulating device, characterised in that it comprises a control device according to the invention.

Advantageously and according to the invention, the control device is received in said regulating device of each turboshaft engine.

Advantageously and according to another variant, the control device communicates, via a wireless connection, with each regulating device of each turboshaft engine.

The invention also relates to a control method, a control device, and a helicopter provided with a control device of this kind, characterised in combination by all or some of the features mentioned above or in the following.

5. LIST OF DRAWINGS

Figure 3:
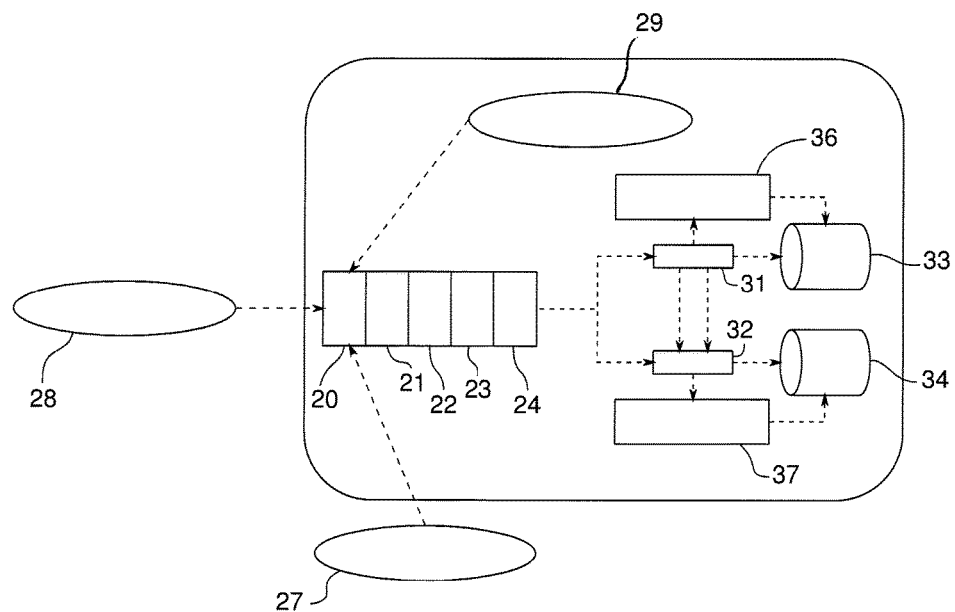
Figure 4:
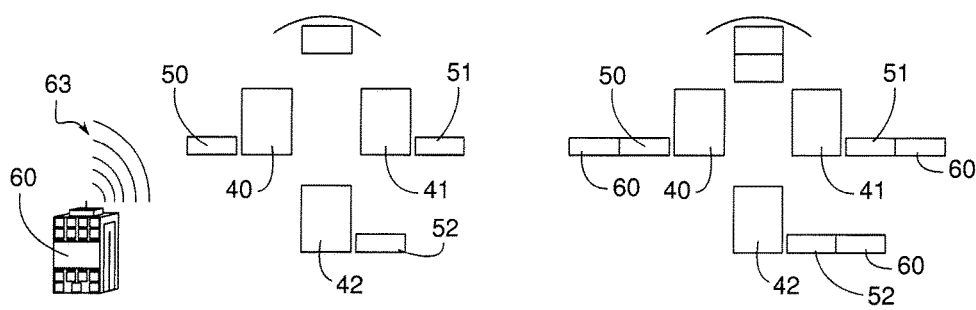
Figure 5:
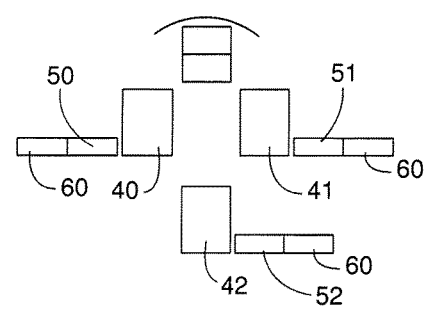
Figure 6:
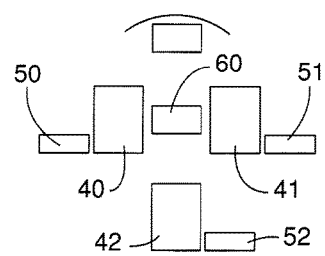

Other aims, features and advantages of the invention will emerge from reading the following description, which is given purely by way of non-limiting example and relates to the accompanying drawings, in which:

FIG. 1 is a schematic view of a method for controlling the operating mode of a turboshaft engine according to an embodiment of the invention, FIG. 2 is a schematic view of the chart required for the step of allocating a designated operating mode to an item of data, on the basis of the value of said item of data, in a method according to an embodiment of the invention, FIG. 3 is a schematic view of a control device according to an embodiment of the invention, FIG. 4 is a schematic view of organic architecture of a helicopter according to an embodiment of the invention, FIG. 5 is a schematic view of a different organic architecture of a helicopter according to an embodiment of the invention, FIG. 6 is a schematic view of a different organic architecture of a helicopter according to an embodiment of the invention.

6. DETAILED DESCRIPTION OF AN EMBODIMENT OF THE INVENTION

A method according to the invention comprises, as shown in FIG. 1, a step 10 of receiving data that are representative of the flight of the helicopter. According to the embodiment in the drawings, the data received are data 27 about the flight conditions of the helicopter, data 28 about the environmental conditions of the helicopter, and data 29 about the state of the turboshaft engine.

According to the advantageous embodiment in the drawings, the method also comprises a step 11 of selecting the turboshaft engine for which a change of mode would be most relevant. According to the advantageous embodiment of FIG. 1, the method also comprises a step 12 of allocating, to each item of data received, a mode, known as the designated mode that is selected from a plurality of predetermined operating modes on the basis of the value of said item of data. The method also comprises a step 13 of determining an operating mode of the turboshaft engine, known as the selected mode, that is selected from all of the designated modes obtained in the allocation step 12, according to a predetermined order of priority. Finally, the method comprises a step 14 of ordering the operating mode of the turboshaft engine into the selected mode.

FIG. 2 schematically shows the principle of the step 12 of allocating a designated operating mode to each type of data item received.

The first line of the table in FIG. 2 contains all of the predetermined modes, of which there are eight according to this embodiment. However, according to other embodiments, the number of predetermined modes that can be allocated to the data may of course be different.

A predetermined designated mode corresponds to each value range of each item of data. The ranges are limited by connecting and increasing values. For example, the item of data denoted A comprises $A2<A3<A4<A5<A6<A7<A8$. Thus, a single designated mode corresponds thereto, depending on the value of the item of data.

For example, for the item of data denoted A, the designated operating mode for this item of data A would be mode 4 if the value of A is within the range [A4; A5].

At the end of this allocation step 12, one mode is allocated to each item of data received during the reception step 10.

The example of five types of received data A, B, C, D and E, of which the values lie within the ranges [A4; A5], [B2; B3], [C4; C5], [D5; D6] and [E6; E7] respectively, will now be considered.

At the end of the allocation step 12, the items of data A, B, C, D and E are thus associated with the modes 4; 2; 4; 5 and 6 respectively.

The modes are arranged in a predetermined order of priority.

According to the embodiment in the drawings, the following operating modes are possible and are arranged in the following manner.

The mode having the highest priority is the nominal operating mode, in which the combustion chamber is ignited and the shaft of the gas generator is driven at between 80 and 105%. This mode is denoted as mode 8 in FIG. 2.

The mode having the next highest priority is the urgent standby-leaving mode, in which the combustion chamber must be ignited if it is not already, and the shaft of the gas generator is brought to the nominal speed within a period of less than 10 seconds following an order to leave standby mode. This mode is denoted as mode 7 in FIG. 2.

The mode having the next highest priority is the normal standby-leaving mode, in which the combustion chamber must be ignited if it is not already, and the shaft of the gas generator is brought to the nominal speed within a period of between 10 seconds and 1 minute following an order to leave standby mode. This mode is denoted as mode 6 in FIG. 2.

The mode having the next highest priority is the standby mode known as normal idling, in which said combustion chamber is ignited and said shaft of the gas generator rotates at a speed of between 60 and 80% of the nominal speed. This mode is denoted as mode 5 in FIG. 2.

The mode having the next highest priority is the standby mode known as normal super-idling, in which said combustion chamber is ignited and said shaft of the gas generator rotates at a speed of between 20 and 60% of the nominal speed. This mode is denoted as mode 4 in FIG. 2.

The mode having the next highest priority is the standby mode known as assisted super-idling, in which said combustion chamber is ignited and said shaft of the gas generator rotates, in a mechanically assisted manner, at a speed of between 20 and 60% of the nominal speed. This mode is denoted as mode 3 in FIG. 2.

The mode having the next highest priority is the standby mode known as banking, in which said combustion chamber is extinguished and said shaft of the gas generator rotates, in a mechanically assisted manner, at a speed of between 5 and 20% of the nominal speed. This mode is denoted as mode 2 in FIG. 2.

The mode having the next highest priority is the standby mode known as stopping, in which said combustion chamber is extinguished and said shaft of the gas generator is completely stopped. This mode is denoted as mode 1 in FIG. 2.

Therefore, at the end of the allocation step 12, data items A and C denote the normal super-idling mode. Data item B denotes the banking mode. Data item D denotes the normal idling mode, and data item E denotes the normal standby-leaving mode.

The step 13 of determining the selected mode selects, from all of the designated modes, the mode that has the highest priority. In other words, and in the case of the example, the determination step 13 selects the mode having the highest priority from the set formed of the normal super-idling mode, the banking mode, the normal idling mode and the normal standby-leaving mode.

In the present case, the mode having the highest priority is the normal standby-leaving mode.

Thus, the control step 14 consists in ordering the turboshaft engine, selected in the selection step 11, into the normal standby-leaving mode.

The same process is repeated at regular and predetermined intervals in order to adapt the operating mode of the turboshaft engine to the progression of the data received in the reception step.

FIG. 3 is a schematic view of a control device according to an embodiment of the invention.

The control device comprises a module 20 for receiving data that are representative of the flight of the helicopter, a module 21 for selecting the turboshaft engine for which a change of mode would be most relevant, a module 22 for allocating a designated operating mode to each item of data received by said reception module 20, a module 23 for determining a selected operating mode selected from the plurality of designated operating modes, and a module 24 for ordering the operating mode of the turboshaft engine into the selected mode.

According to the embodiment in the drawings, the data received by the reception module 20 are data 27 about the flight conditions of the helicopter, data 28 about the environmental conditions of the helicopter, and data 29 about the state of the turboshaft engine.

Once the selected mode has been determined by the determination module 23, the control module 24 sends the order to change modes to the electronic regulator of the selected turboshaft engine, i.e. either the electronic regulator 31 of the turboshaft engine that controls the gas turbine 33 of the turboshaft engine, or the electronic regulator 32 of the turboshaft engine that controls the gas turbine 34 of the turboshaft engine. The electronic regulators 31 and 32 are also suitable for operating the non-propulsive parts 36 and 37 of the gas turbines 33 and 34.

According to the embodiment in FIG. 3, the control device controls the operating modes of a helicopter comprising two turboshaft engines, each turboshaft engine comprising a gas turbine 33, 34 that is controlled by an electronic regulator 31, 32 (more commonly known as EECU). Each regulator 31, 32 controls the non-propulsive parts 35, 36 of the gas turbine and of the corresponding gas turbine 33, 34.

According to another embodiment, and as shown in FIGS. 4, 5 and 6, the control device 60 controls the selection of the operating modes of a helicopter comprising three turboshaft engines 40, 41, 42.

According to the embodiment of FIG. 4, the control device 60 is outside the turboshaft engines 40, 41, 42 and communicates via a wireless connection 63 with each regulating device 50, 51, 52 of each turboshaft engine. In FIG. 4, for the purpose of clarity only the connection 63 between the control device 60 and the regulating device 50 of the turboshaft engine 40 is shown. Nonetheless, the control device 60 communicates with each regulating device in order to be able to order a change in the operating mode of the associated turboshaft engine if the data require this.

According to the embodiment of FIG. 5, the control device 60 is divided between the engine computers and the helicopter avionics.

According to the embodiment of FIG. 6, the control device 60 is received in a dedicated housing.

The invention is not limited to just the embodiments described. In particular, other types of architecture are possible for receiving the control device. Moreover, a control method and device according to the invention can be used to control a helicopter comprising a different number of turboshaft engines and/or having a different number of operating modes.

The invention claimed is:

1. A method for automatically controlling the operating mode of a turboshaft engine of a helicopter that is not in a critical flight situation and comprises at least two turboshaft engines, wherein one of said at least two turboshaft engines is not in a critical flight situation, the method comprising:
   a step of receiving data that are representative of the flight of the helicopter,
   a step of determining an operating mode of said one turboshaft engine, known as the selected mode, selected from a plurality of predetermined operating modes on the basis of said data that are representative of the flight of the helicopter,
   a step of ordering the operating mode of said one turboshaft engine into said selected mode,
wherein each of said at least two turboshaft engines comprises a combustion chamber and an engine shaft, and said plurality of predetermined operating modes comprises at least the following modes:
   a standby mode known as normal idling, in which said combustion chamber is ignited and said shaft of the gas generator rotates at a speed of between 60 and 80% of the nominal speed,
   a standby mode known as normal super-idling, in which said combustion chamber is ignited and said shaft of the gas generator rotates at a speed of between 20 and 60% of the nominal speed,
   a standby mode known as assisted super-idling, in which said combustion chamber is ignited and said shaft of the gas generator rotates, in a mechanically assisted manner, at a speed of between 20 and 60% of the nominal speed,
   a standby mode known as banking, in which said combustion chamber is extinguished and said shaft of the gas generator rotates, in a mechanically assisted manner, at a speed of between 5 and 20% of the nominal speed,
   a standby mode known as stopping, in which said combustion chamber is extinguished and said shaft of the gas generator is completely stopped,
   an urgent standby-leaving mode, in which the combustion chamber is ignited and the shaft of the gas generator is brought to a speed of between 80 and 105% within a period of less than 10 seconds following an order to leave standby mode,
   a normal standby-leaving mode, in which the combustion chamber is ignited and the shaft of the gas generator is brought to a speed of between 80 and 105% within a period of between 10 seconds and 1 minute following an order to leave standby mode,
   a nominal operating mode, in which the combustion chamber is ignited and the shaft of the gas generator is driven at a speed of between 80 and 105%.

2. The method according to claim 1, wherein said method comprises a step of allocating, to each item of data received, an operating mode, known as the designated mode, that is selected from said plurality of operating modes and depends on the value of said item of data.

3. The method according to claim 2, wherein, for each item of data, a designated mode is associated with a range of values of said item of data.

4. The control method according to claim 2, wherein said step of determining a selected mode includes selecting said selected mode from all of said designated modes provided by said allocation step, according to a predetermined order of priority.

5. The control method according to claim 4 each of said at least two turboshaft engines comprises a combustion chamber and an engine shaft, and said plurality of predetermined operating modes comprises at least the following modes:
   a standby mode known as normal idling, in which said combustion chamber is ignited and said shaft of the gas generator rotates at a speed of between 60 and 80% of the nominal speed,
   a standby mode known as normal super-idling, in which said combustion chamber is ignited and said shaft of the gas generator rotates at a speed of between 20 and 60% of the nominal speed,
   a standby mode known as assisted super-idling, in which said combustion chamber is ignited and said shaft of the gas generator rotates, in a mechanically assisted manner, at a speed of between 20 and 60% of the nominal speed,
   a standby mode known as banking, in which said combustion chamber is extinguished and said shaft of the gas generator rotates, in a mechanically assisted manner, at a speed of between 5 and 20% of the nominal speed,
   a standby mode known as stopping, in which said combustion chamber is extinguished and said shaft of the gas generator is completely stopped,
   an urgent standby-leaving mode, in which the combustion chamber is ignited and the shaft of the gas generator is brought to a speed of between 80 and 105% within a period of less than 10 seconds following an order to leave standby mode,
   a normal standby-leaving mode, in which the combustion chamber is ignited and the shaft of the gas generator is brought to a speed of between 80 and 105% within a period of between 10 seconds and 1 minute following an order to leave standby mode,
   a nominal operating mode, in which the combustion chamber is ignited and the shaft of the gas generator is driven at a speed of between 80 and 105%,
wherein said predetermined order of priority is as follows:
   nominal operating mode,
   urgent standby-leaving mode,
   normal standby-leaving mode,
   normal idling mode,
   normal super-idling mode,
   assisted super-idling mode,
   banking mode,
   stopping mode.

6. The control method according to claim 1, wherein said data that are representative of the flight of the helicopter comprise data about the flight conditions of said helicopter and/or data about the environmental conditions of the helicopter and/or data about the state of said one turboshaft engine.

7. The control method according to claim 1, wherein said method further comprises a step of selecting one turboshaft engine from said at least two turboshaft engines of said helicopter for which a change of mode would be most relevant.

8. A control device for automatically controlling an operating mode of a first turboshaft engine of a helicopter that is not in a critical flight situation and said helicopter comprises at least two turboshaft engines, said device comprising:

a module for receiving data that are representative of the flight of the helicopter, a module for determining an operating mode of said first turboshaft engine, known as the selected mode, selected from a plurality of predetermined operating modes on the basis of said data that are representative of the flight of the helicopter, a module for ordering said operating mode of said first turboshaft engine into said selected mode, wherein each of said at least two turboshaft engines comprises a combustion chamber and an engine shaft, and said plurality of predetermined operating modes comprises at least the following modes:

a standby mode known as normal idling, in which said combustion chamber is ignited and said shaft of the gas generator rotates at a speed of between 60 and 80% of the nominal speed, a standby mode known as normal super-idling, in which said combustion chamber is ignited and said shaft of the gas generator rotates at a speed of between 20 and 60% of the nominal speed, a standby mode known as assisted super-idling, in which said combustion chamber is ignited and said shaft of the gas generator rotates, in a mechanically assisted manner, at a speed of between 20 and 60% of the nominal speed, a standby mode known as banking, in which said combustion chamber is extinguished and said shaft of the gas generator rotates, in a mechanically assisted manner, at a speed of between 5 and 20% of the nominal speed, a standby mode known as stopping, in which said combustion chamber is extinguished and said shaft of the gas generator is completely stopped, an urgent standby-leaving mode, in which the combustion chamber is ignited and the shaft of the gas generator is brought to a speed of between 80 and 105% within a period of less than 10 seconds following an order to leave standby mode, a normal standby-leaving mode, in which the combustion chamber is ignited and the shaft of the gas generator is brought to a speed of between 80 and 105% within a period of between 10 seconds and 1 minute following an order to leave standby mode, a nominal operating mode, in which the combustion chamber is ignited and the shaft of the gas generator is thriven at a speed of between 80 and 105%.

9. The control device according to claim 8, wherein said control device comprises a module for allocating, to each item of data received by said reception module, an operating mode, known as the designated mode, that is selected from said plurality of operating modes and depends on the value of said item of data.

10. The control device according to claim 9, wherein said determination module is designed to select said selected mode from all of said designated modes provided by said allocation module, according to a predetermined order of priority.

11. The control device according to claim 8, wherein said control device further comprises a module for selecting one turboshaft engine from said at least two turboshaft engines of said helicopter for which a change of mode would be most relevant.

12. A helicopter comprising at least two turboshaft engines, each turboshaft engine comprising a gas turbine controlled by a regulating device, wherein said regulating device comprises a control device according to claim 8.

13. A helicopter according to claim 12, wherein said control device is received in said regulating device of each turboshaft engine.

14. A helicopter according to claim 12, wherein said control device communicates, via a wireless connection, with each said regulating device of each said turboshaft engine.

* * * * *